(12) United States Patent  (10) Patent No.: US 9,193,451 B2
Salyer  (45) Date of Patent: Nov. 24, 2015

(54) AIRCRAFT USING TURBO-ELECTRIC HYBRID PROPULSION SYSTEM FOR MULTI-MODE OPERATION

(71) Applicant: Ival O. Salyer, Flowery Branch, GA (US)

(72) Inventor: Ival O. Salyer, Flowery Branch, GA (US)

( * ) Notice: Subject to any disclaimer, the term of this patent is extended or adjusted under 35 U.S.C. 154(b) by 271 days.

(21) Appl. No.: 13/867,628

(22) Filed: Apr. 22, 2013

(65) Prior Publication Data

US 2014/0346283 A1 Nov. 27, 2014

(51) Int. Cl.
| | |
|---|---|
| B64C 27/24 | (2006.01) |
| B64C 37/00 | (2006.01) |
| B64D 27/24 | (2006.01) |
| B64C 27/14 | (2006.01) |
| B64D 27/02 | (2006.01) |

(52) U.S. Cl.
CPC ............... B64C 27/24 (2013.01); B64C 27/14 (2013.01); B64C 37/00 (2013.01); B64D 27/24 (2013.01); B64D 2027/026 (2013.01); Y02T 50/64 (2013.01); Y10S 903/903 (2013.01)

(58) Field of Classification Search
CPC .. B64D 27/14; B64D 35/08; B64D 2027/026; B64C 27/22; B64C 27/24; B64C 37/00; B64C 39/006
See application file for complete search history.

(56) References Cited

U.S. PATENT DOCUMENTS

| | | | |
|---|---|---|---|
| 5,405,104 A * | 4/1995 | Pande | 244/7 A |
| 6,655,631 B2 | 12/2003 | Austen-Brown | |
| 6,669,137 B1 * | 12/2003 | Chen | 244/7 R |
| 6,986,642 B2 | 1/2006 | Carter | |
| 7,448,571 B1 | 11/2008 | Carter, Jr. et al. | |
| 2009/0145998 A1 * | 6/2009 | Salyer | 244/17.23 |
| 2009/0293494 A1 * | 12/2009 | Hoffjann et al. | 60/780 |
| 2013/0126666 A1 * | 5/2013 | Brown | 244/2 |
| 2013/0181088 A1 * | 7/2013 | Casado Montero et al. | 244/50 |

* cited by examiner

*Primary Examiner* — Timothy D. Collins
*Assistant Examiner* — Nicholas McFall
(74) *Attorney, Agent, or Firm* — Dinsmore & Shohl LLP

(57) ABSTRACT

A vehicle incorporating a hybrid propulsion system. In one form, the vehicle may be an aircraft such that the system includes gas turbine engines as a first motive power source, and one or more battery packs as a second motive power source. Through selective coupling to an electric motor that can in turn be connected to a bladed rotor or other lift-producing device, the motive sources provide differing ways in which an aircraft can operate. In one example, the gas turbine engines can provide operation for a majority of the flight envelope of the aircraft, while the battery packs can provide operation during such times when gas turbine-based motive power is unavailable or particularly disadvantageous. In another example, both sources of motive power may be decoupled from the bladed rotor such that the vehicle can operate as an autogyro. In another mode of operation, the movement of a bladed rotor can be both decoupled from the sources of propulsion as well as fixed relative to the aircraft such that the aerodynamic surfaces formed on the bladed rotors can act as a fixed wing. In another particular form, the vehicle may be ground-based or water-based.

24 Claims, 3 Drawing Sheets

AIRCRAFT USING TURBO-ELECTRIC HYBRID PROPULSION SYSTEM FOR MULTI-MODE OPERATION

BACKGROUND OF THE INVENTION

The present invention relates generally to vehicles with hybrid propulsion systems, and more particularly to a combination of a gas turbine-based propulsion system and a stored electric-based power system that cooperates with rotational lift or thrust-producing devices to permit a vehicle to operate in numerous modes of movement.

Aircraft are broadly categorized as either fixed-wing vehicles (such as an airplane) or rotary-wing vehicles (such as helicopters and autogyros, the latter also referred to as autogyros or gyrocopters). Gas turbine engines (which are one form of internal combustion engine) are widely used to power both the fixed-wing and rotary wing forms of aircraft, where fixed-wing vehicles often employ turbofan, turbojet and turboprop variants, and rotary-wing vehicles often employ turboshaft variants. In all circumstances, the basic gas generator hardware is common, including a compressor, a combustor and turbine, where the compressor and turbine rotate on a generally common shaft (or set of concentric shafts) such that energy extracted from the turbine is used to power the compressor. Turbofans are very similar to turbojets, with the exception that they typically include an additional fan located upstream of the compressor. A turboprop engine, in addition to including the respective turbofan or turbojet componentry, also includes a fore-mounted drive shaft that spins in common with the shaft of the compressor and turbine. To match the high rotational speed of the compressor and turbine to that of a propeller, a gearbox is inserted between the front end of the drive shaft and a propeller shaft. Turboshafts also include similar components to the turbofans and turbojets, and additionally include a shaft rotatably responsive to another turbine stage. Both fixed-wing and rotary-wing vehicles contain advantages and disadvantages. The present invention seeks to combine these types of aircraft into one which can selectively take advantage of fixed or rotary-winged aircraft.

In turboshaft engines, power generated by the gas generator (which is spinning about a generally horizontal axis) is transferred to the shaft (which is spinning about a generally vertical axis such that it can turn a rotor made up of a series of blades that radially extend from a central hub) through a gearing mechanism, such as a beveled or worm gear. Shaft horsepower needs to produce a particular rotor rotational speed that varies depending on the aircraft type, size and intended mission. For example, the CH-47 Chinook is a popular twin-rotor helicopter designed for commercial and military heavy lifting. Rotor blade power requirements for helicopters such as this may be in the range of five thousand horsepower, while speed requirements of around two hundred and twenty five revolutions per minute (RPM) are typical.

Despite their widespread use, conventional gas turbine-based propulsion systems have significant drawbacks for certain types of aircraft. For example, in the event a turboshaft engine fails, a helicopter, gyrocopter or other inherently unstable aircraft has no way of returning to earth under its own power, and at best can expect to have to endure a controlled crash landing. Likewise, if a helicopter employing a turboshaft engine as propulsive power is flying or hovering over an area where terrorists, armed conflict or related hostilities exist, the extreme heat put out by the engine or engines may make the helicopter exceedingly vulnerable to attack from infrared (IR) seeking weaponry. Furthermore, to the extent that there are existing rotary-winged aircraft (such as the Bell Boeing V-22 Osprey) that are configured to operate in both a helicopter mode of operation and in a fixed-wing aircraft mode of operation, significant mechanical complications abound, including the necessity of tilting the entire wing in order to shift between modes. Moreover, such a configuration does not provide the ability to operate as a gyrocopter, where additional fuel economy and related range may be possible. In addition, in situations where power may be lost, there is no ability with a design where the propeller is directly coupled to the engine to shift the rotors into a freewheeling position; this in turn imperils slow, controlled aircraft descents for emergency landings. Accordingly, there exists a need for an aircraft and a propulsion system that overcomes these and other shortcomings.

BRIEF SUMMARY OF THE INVENTION

These needs are met by the present invention, where in accordance with a first aspect of the present invention, an aircraft employing a hybrid propulsion system is disclosed. The aircraft includes a fuselage, body or related airframe, a thrust-producing device coupled to the fuselage, and a hybrid propulsion system configured to provide power to operate the thrust producing device. Cooperation between the propulsion system and the thrust producing device provides motive power to the aircraft. In one form, the thrust-producing device is a bladed rotor, where the rotating blades produce both lift and thrust if oriented properly relative to the aircraft. In the present context, the terms "lift" and "thrust", while recognized in general aeronautical terms as representing two of the four primary forces acting upon an aircraft in flight (the other two being drag and weight), are used somewhat interchangeably as those forces that contribute to the craft's upward or forward movement. Circumstances in the present disclosure where lift and thrust retain their traditionally-accepted aeronautical definitions will be apparent from the context. For example, the rotation of a bladed rotor that is coupled to the aircraft in a helicopter mode of operation will be understood to provide one or both of lift and thrust, depending at least in part on the orientation of the rotor relative to the aircraft to which it is attached. Likewise, if the aircraft is configured to be in a fixed-wing mode of operation, the rotation of the blades on the rotors may be fixed relative to the aircraft in order to have the rotors solely perform a lift function (where the thrust comes from companion gas turbine engines).

The propulsion system attains its hybrid nature by possessing two forms of power. The first comes from a gas turbine (i.e., jet) engine, while the second comes from an electric DC generator or a battery storage device. Such hybrid power sources may be tailored for use over various parts of the aircraft flight envelope where each exhibits relative strengths or advantages. In the present context, the flight envelope includes various parts of the flight path that the aircraft may be expected to encounter over the course of its operation. By way of non-limiting example, such parts include startup, ground loiter, takeoff, cruise, loiter/hover and landing. As such, the gas turbine engine can be used to provide power to the thrust and/or lift producing device over a portion of the aircraft's flight envelope that requires long-term power, such as during aircraft cruise. Likewise, the electric storage device can be used to power the aircraft over a portion of the aircraft's flight envelope that benefits from reduced thermal or pollutant emissions from the gas turbine engine, such as startup, hovering, loitering or the like. An electrical generator is also placed in cooperation with the shaft so that mechanical power from the gas turbine is converted to electric power for use by an electric motor that is coupled to the thrust producing device. The presence of the electrical generator allows the electric motor to accept a common form of power (i.e., electric current) from either the gas turbine engine or the electric storage device.

In a preferred form, the electric storage device comprises at least one battery, which may be in the form of a single battery or part of a battery pack. In one particular form, the battery is a lithium battery or other suitable type configured to deliver high specific power. In order to achieve desirable weight balances in the aircraft, the gas turbine engine or engines may be placed in the aft portion of the aircraft's center of gravity (COG) and include a forward extension of a central transmission shaft that extends from its main rotational shaft (i.e., the one or ones coupled to the engine's compressor or turbine) to deliver power to the electrical generator that may be mounted on a fore portion of the aircraft's COG. A clutch can be disposed on or with the shaft such that during the portion of the aircraft's flight envelope where that power generated in the gas turbine engine is to be used, the clutch provides the necessary disconnect between the engine and the electrical generator. The battery or other electric storage can be kept charged during the portion of the aircraft's flight envelope where the gas turbine engine is providing the aircraft's power, as excess power from the gas turbine engine can be fed through the electrical generator to the battery. In one form, the electric motor is a DC motor. As stated above, the thrust producing device can be a bladed rotor oriented in such a way that upon attaining a minimum rotational speed, it possesses at least one of lift and thrust attributes. During the portion of the aircraft's flight envelope where the power to operate the thrust producing device is coming from the electric storage device, the gas turbine engine can be rendered substantially inoperable by the clutch such that the gas turbine's operation is reduced or turned off entirely, where in the present context, the term "substantially" refers to an arrangement of elements or features that, while in theory would be expected to exhibit exact correspondence or behavior, may, in practice embody something less than exact. As such, the term denotes the degree by which a quantitative value, measurement or other related representation may vary from a stated reference without resulting in a change in the basic function of the subject matter at issue.

A controller may be used to provide some automation to the operation of the aircraft. Included is the ability to vary operation of the aircraft between a first and second portion of its flight envelope. In a more particular form, the controller can be used in conjunction with actuation equipment to provide full robotic control of the aircraft over many or all segments of the aircraft flight envelope, including take-off and landing. Such full control is especially beneficial in unmanned aircraft configurations. Suitable controllers and ancillary equipment (such as actuators, transceivers and related communication infrastructure, electric wiring, sensors or the like) may enable the aircraft to be readily adaptive for computer control and robotic (i.e., unmanned air vehicles (UAVs)) or other remote flying. The controller may also be used to provide differing control signals to each of the outboard gas turbine engines such that improved aircraft maneuverability is possible through steering, turning or the like. In one form, the controller may include four throttle control for each of the two gas turbine engines or to each of the two single bladed rotors to be separately controlled. For example, by decreasing the power to the port or starboard rotor and increasing to the opposing starboard or port rotor, turning in a preferred direction may be facilitated. Likewise, the thrust from the engines can also be varied wherein the power to the engine on one side of the fuselage or the other can be decreased while the opposing engine's power is increased when turning.

According to another aspect of the present invention, an aircraft is disclosed. The aircraft includes a fuselage, a plurality of bladed rotors coupled to the fuselage through a rotatable shaft, and a hybrid propulsion system coupled to the fuselage and the bladed rotors, each of which has two blades affixed thereto. The propulsion system includes a gas turbine engine, an electrical generator, an electric storage device and an electric motor selectively coupled to at least one of the electrical generator and the electric storage device. The generator is selectively coupled to the gas turbine engine so that when engaged mechanical power received from a shaft extending from the engine can be converted by the electrical generator to electric power for use by the electric motor. In this way, the generator normalizes the energy being input into the electric motor. During one (for example, a first) portion of a flight envelope of the aircraft, the gas turbine engine, electric generator and the one or more rotors provide at least a majority of motive power to the aircraft, while during another (for example, a second) portion of the flight envelope, the electric storage device and the rotor or rotors provide at least a majority of the motive power to the aircraft. In one or more portions of the flight envelope, it may be desirable to have the aircraft function as a fixed-wing vehicle as discussed above; in such cases, the hybrid propulsion system may be operated such that some or all of the energy produced by the gas turbine engines is used to provide direct thrust to the fuselage through the expulsion of high speed exhaust gases during such portion or portions. Numerous clutches may be used to provide selective engagement between the rotatable shaft and the gas turbine engines, while a detent-based mechanism may be used to lock the rotor in a particular orientation relative to the fuselage; in this way, the same blades that are capable of providing at least one of lift and thrust in a helicopter or gyrocopter mode of operation become fixed relative to the aircraft such that they emulate a wing or related lift-producing device. Besides the fixed-wing configuration, the aircraft may also be operated as a helicopter or gyrocopter where the former is capable of having much lower landing and takeoff speeds for use in situations with short take off and landing fields. Significantly, switching between flight modes can be accomplished on the ground or in-flight by activation of one or more of the detent and the connect-disconnect clutches. In order to safely change more one mode of aircraft operation to another such as the change from helicopter to gyrocopter or gyrocopter to jet plane configuration, such changes to be made safely in air need to be performed at a safe operating altitude of at least 2500 feet or more and at a safe air speed of at least about 100 mph above the critical stall speed. This precaution is necessary in order to insure that the plane would have sufficient altitude in which to recover from the stall before crashing into the ground.

According to another aspect of the present invention, a method of providing motive power to an aircraft is disclosed. The method includes coupling a hybrid propulsion system to a thrust producing device and operating the system such that power produced by it operates the thrust producing device. The hybrid propulsion system includes a gas turbine engine, an electric storage device configured to deliver an electric current and an electrical generator responsive to the gas turbine engine such that power produced by the operation of the engine is converted into electric current. In addition, the system includes an electric motor selectively responsive to the generator and the electric storage device. By having the electric motor be responsive to electric current irrespective of its source (i.e., the gas turbine engine or the electric storage device), the use of redundant componentry is avoided. A significant portion of the operation of the aircraft is that it may include a mode of operation where—subject to battery life limitations—the gas turbine engine can be turned off or otherwise curtailed enough so that one or more of its thermal output and pollutant output is substantially ceased. In addition, the cooperation of the gas turbine engines and electrical generator is such that excess power produced by the engines is conveyed to the electric storage device through the generator to maintain the electric storage device in a substantially charged condition. As with the previous aspects, computerized control may be affected through a controller and associated actuators, as well as through cooperation of the same with a transceiver to allow remote control, depending on the mission, aircraft configuration or like considerations. Furthermore, the aircraft may be configured as a helicopter, gyrocopter or jet plane selectable aircraft. The hybrid propulsion system is such that the rotor blades may be decoupled from the generator and electric storage device by means of a clutch. The rotor blades are also able to be locked at different angles relative to the longitudinal axis of the aircraft similar to the "swept back" wings on jet aircraft. The aerodynamic lift surfaces (which may correspond to one of numerous National Advisory Committee for Aeronautics (NACA) profiles) of the rotors allow them to act as airfoils; as such, they can be configured in situations where the rotors are set in a fixed position relative to the aircraft to act as wings or related aircraft lift structure. The clutches and detent/solenoid may be engaged and disengaged as the pilot sees fit for the circumstances, changing between helicopter, gyrocopter and jet plane mode.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
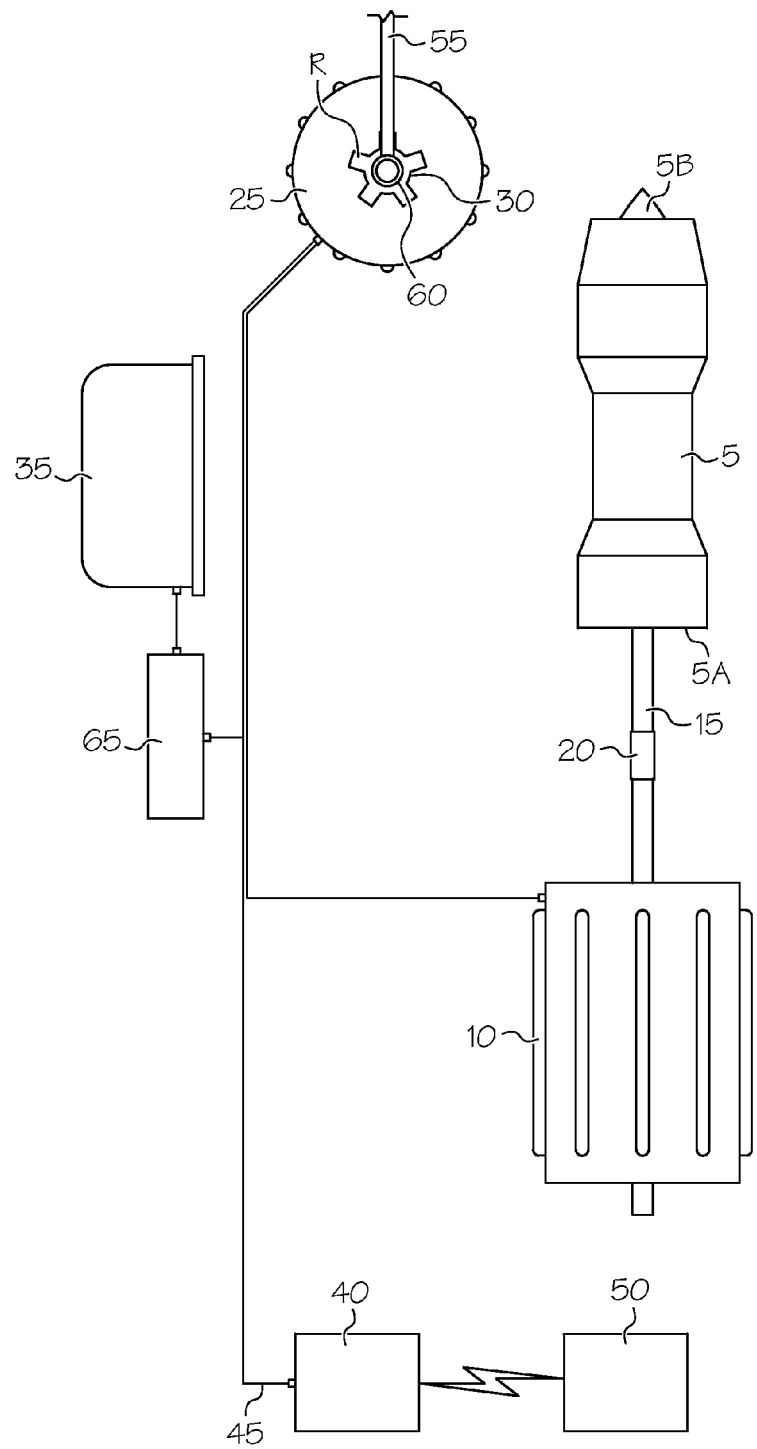
FIG. 1 shows schematically a hybrid propulsion system according to an embodiment of the present invention.

Referring initially to FIG. 1, a hybrid propulsion system 1 according to an embodiment of the present invention is shown. In the present context, a hybrid propulsion system is one that provides motive power for an aircraft or other vehicle from two or more disparate power sources. In a more particular form, the hybrid propulsion system 1 is a turbo-electric propulsion system that is particularly well-suited to powering a rotary-winged aircraft such as a helicopter or autogyro, as well as a fixed-wing aircraft that will be discussed in more detail below. The invention disclosed herein achieves that objective through shaft power provided by an internal combustion engine and electric power provided by one or more batteries. Both power sources, which are described below in more detail, can convert their energy into a form useable by an electric motor that can be used to turn one or more lifting surfaces on an aircraft, as well as one or more propulsive members in a watercraft or land-based craft (neither of which are shown).

The first of these motive power sources is a gas turbine engine 5 with an air inlet 5A and a hot gas exhaust 5B. An electric generator (also referred to herein as an electrical current generator or electrical generator) 10 is connected to the engine 5 through a primary transmission shaft 15 that extends straight between them so that rotational movement of the engine shaft imparts comparable rotational movement within the generator 10 via shaft 15. A clutch (also called a motor clutch) 20 is used to allow the engine 5 and generator 10 to be selectively decoupled from one another along the shaft 15. The term "clutch" in the specification is used to represent a device which is able generally to permit the selective flow of power from one unit to another, and more particularly within the context of rotating shaft power to selectively transfer such power from one rotating shaft to another shaft. In one form, motor clutch 20 utilizes a mechanical friction plate to facilitate the necessary connection and disconnection. Such disconnection allows the engine 5 to operate independently for jet flight used in conjunction with the fixed wing aircraft mode of operation discussed below. The electric generator 10 is capable of supplying adequate DC current to run a DC electric motor 25, which in turn can supply sufficient power to turn a propeller (or related bladed rotor) 30 that is used to provide lift to the aircraft. Generator 10 can be of either an alternating current (AC) or direct current (DC) variety, although the remainder of this disclosure will focus on the DC variant, since such a configuration will abrogate the need for a battery-charging rectifier. Rotor 30 is presently shown with five blade roots R, although—as mentioned elsewhere in the present disclosure—a two-bladed configuration is preferred in order to facilitate fixed-wing flight modes. As can be seen, two of the heavier components making up hybrid propulsion system 1—the gas turbine engine 5 and the generator 10—are arranged in an in-line configuration to help establish better fore and aft weight balance for an aircraft. The power requirements of the engines 5 are based on the size and configuration of the aircraft. For example, a U.S. Chinook helicopter requires about 4900 shaft horsepower to turn the blades at approximately 225 revolutions per minute, generating around 113600 foot-pounds of torque. Likewise, a U.S. Black Hawk helicopter requires about 1900 shaft horsepower to turn the blades at approximately 260 revolutions per minute, generating around 39500 pound-feet of torque.

The second source of motive power may come from one or more external battery packs 35. Rather than converting the rotational mechanical energy of the engine 5 and primary transmission shaft 15 into DC electric current through the generator 10 to provide the DC electric motor 25, the external battery packs 35 provide it directly to the motor 25. While such a battery pack (or packs) 35 may be made large enough to provide aircraft motive power for relatively long durations of flight, the present inventor has recognized that a battery pack 35 so sized may be impractically heavy, bulky or the like. As such, the battery pack 35 used in the present invention should be sized to provide such motive power for short-term operation, the duration of which is dictated by anticipated mission or emergency requirements. In such circumstance, clutches connecting the DC motors 25 to their respective rotors 30 can be deactivated to permit free rotor 30 movement.

Switching between the two power sources of engine 5 and external battery pack 35 is effected through a controller 40 that may be connected to one or more actuators (not shown) through either cables 45 for hardwired connection or a wireless transceiver 50. For example, if a determination is made (such as through pilot input, for example) that motive power is to be provided to the aircraft through the external battery pack 35, the controller 40 can instruct the clutch 20 to decouple the primary transmission shaft 15 from engine 5. Such disconnection may be particularly advantageous in circumstances where the engine 5 is inoperable or its use would be potentially harmful or wasteful. For example, powering the bladed rotor 30 through electricity provided by the external battery pack 35 can be used to run an aircraft in a low thermal output mode until such time as it is determined appropriate to rely upon the engine 5 for such motive power. In one form, controller 40 is a computer (i.e., microprocessor)-based system that can control some or all aspects of the aircraft flight envelope. Such allows preprogrammed automation of actuator functions, as well as the ability to accept input control signals from a remote location, in the case of UAVs, through transceiver 50.

A secondary transmission shaft 55 can be used to supply power to additional rotor(s), such as a second lifting rotor coupled to each gas turbine engine 5. Another clutch (also referred to herein as the rotor clutch) 60 can be used in a manner generally similar to motor clutch 20 to selectively couple the DC electric motor 25 and bladed rotor 30. Disconnection of bladed rotor 30 from the engine 5 and battery pack 35 through clutch 60 permits the bladed rotor 30 to freely spin, which may be advantageous during emergency procedures as it allows the aircraft to operate in an autogyro mode with a more controlled descent. Likewise, clutch 60 can enable the aircraft to run on electric power supplied by an appropriately sized internal battery pack (discussed below) for start-up and other ground operations.

As will be appreciated by those skilled in the art, operation of the engine 5 to turn the bladed rotor 30 involves the conversion of mechanical (shaft) energy in the engine 5 to electrical energy in the generator 10 and back into mechanical energy at the motor 25. Reductions in propulsion system 1 efficiency due to losses attendant to each conversion are more than offset by the increased functionality that arises out of having both the engine 5 and external battery pack 35 provide motive power to the aircraft. The present inventor has discovered that at least for UAVs, autogyros, helicopters and related craft, the present invention and related benefits provided thereby is a practical way to achieve desirable system redundancy and multiple modes of operation.

An internal battery pack 65 capable of providing start up power and powering any needed internal systems is also provided. Such internal battery pack 65 may be connected to an auxiliary power unit (APU, not shown) to effect such starting and aircraft support functions. In addition to clutches 20 and 60, controller 40 may, among other things, control operation of the battery packs 35 and 65, speed of the DC electric motor 25, and pitch of blades (discussed in more detail below) of bladed rotor 30. As mentioned above, wireless transceiver 50 may, in addition to providing local controls within the aircraft, receive fly-by-wire commands for unmanned operation, such as in a UAV. In such a case, the wireless transceiver 50 and controller 40 may cooperate to provide complete automated electronic (i.e., computerized) robotic control of the aircraft over a part or the entirety of its mission. In a latter example, such robotic control may include take-off and landing, as well as in-flight maneuvers. Cable 45 or related wiring, such as that familiar to those skilled in the art, is used to provide electrical connectivity between the various components. Such connectivity can be used to provide low current control and information signals, as well as high current to the DC electric motor 25 and related motive power componentry.

There are at least three types of DC electric motors 25 available, generally categorized as traditional, brushless, and coreless. Traditional DC motors use a core of iron bound with copper or other highly conductive wire. The core is centered in a series of magnets such that power (in the form of electric current) is transmitted to the core via graphite brushes. In the present context, the electric current is DC coming from the generator 10 or battery pack 35. Brushless motors use many of the same materials as the traditional DC motor configuration, but reverse them, placing the magnets in the center surrounded by the copper wiring. Power is supplied to the copper wiring, which allows the magnet to spin. The coreless motors are arranged in the same manner as traditional DC motors, but replace the iron and copper with aluminum meshes bound in glass epoxy. The choice of motor 25 configuration can be readily made depending on (among other factors) the type of application, as well as motor availability, weight and cost. These factors being equal, the brushless type is preferred for both the generator and the rotor motors due to the brushless motor's greater reliability and longevity. Nevertheless, in situations where traditional DC electric motors are used, weight reduction can be achieved if motor use is limited to discreet periods or functions. For example, the majority of the weight of a DC electric motor 25 comes from the motor housing, which is usually steel or a related iron-based metal. Such weight could be significantly reduced by using a lightweight, composite material for the motor housing such as high heat resistant thermoset resins with fiber glass reinforcement or newer, high strength, high heat resistant organic film. Further weight reduction would be possible by replacing the iron core magnets with rare earth cobalt (or related) magnets. Other options, such as nickel-metal hydride and lithium ion batteries used to provide power to hybrid automobiles could be used to provide the necessary power without the significant weight penalties of traditional electric motors.

For water transportation, for especially relatively small boats, a single gas turbine engine 5 with the forward shaft extension 15 connected via a gear reduction transmission (not shown) and the clutch 20 to generator 10 of appropriate capacity may be employed. This generator 10 would then supply power to a DC motor 25 that may be connected to the propeller (not shown) which in turn churns water to propel the watercraft. Likewise, larger watercraft could employ at least two propellers, while the number of gas turbine engines 5 and generators 10 could be increased to supply the amount of additional power required. For ground-based transportation (i.e., cars, trucks, buses or the like), the DC generator 10 would in turn supply power to electric motors 25 attached to at least two and preferably four of the driving wheels to provide improved traction; such a configuration is particularly well-suited to oft-frozen and other geographic locations where ground traction is a major problem.

Figure 2:
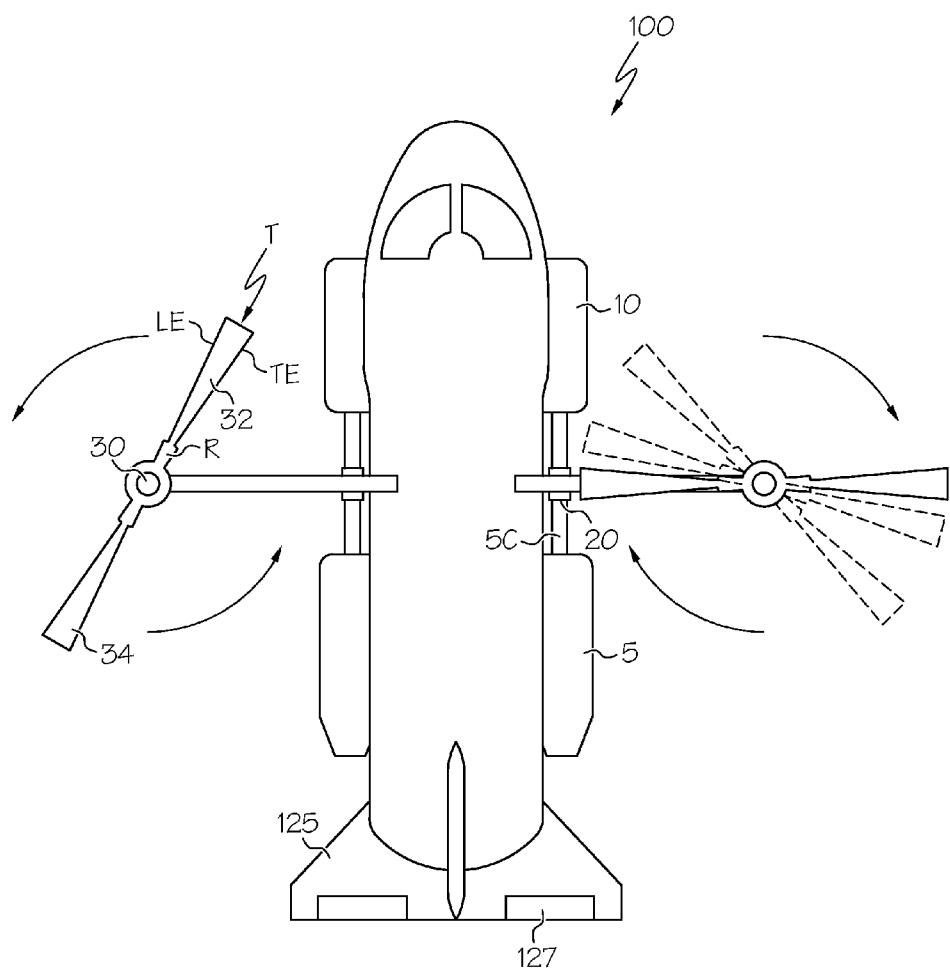
FIG. 2 shows a top elevation of an aircraft that can be adapted for fixable rotary-winged operation according to yet another embodiment of the present invention.
Figure 3:
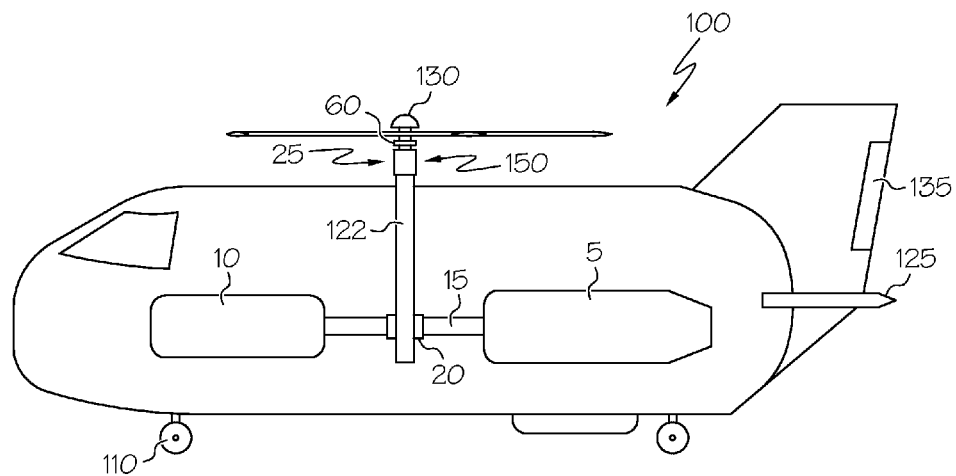
FIG. 3 shows a side elevation of the aircraft of FIG. 2.

Referring next to FIGS. 2 and 3, top and elevation drawings of the incorporation of the present hybrid propulsion system 1 into an aircraft 100 are shown. Two gas turbine engines 5 are situated on laterally opposing sides (i.e., starboard and port) of aft portion of the fuselage 105 of aircraft 100, and both (through respective shafts 15) can provide motive power to the bladed rotor 30. In addition, the transmission shafts 15 connect the engine 5 with the DC electric generator 10 that are forward portion of the fuselage 105. Preferably, the generator 10 is disposed longitudinally in front of the gas turbine engine 5 such that primary shaft 15 extends forward from the inlet 5A of engine 5 such that shaft 15 spins along an axis common to both the engine 5 and the DC generator 10. Such an in-line configuration could make for a more efficient transfer of power from the engine 5 to the generator 10, as loss due to the right angled gearing is removed. In one exemplary form, shaft 15 should extend forward of a distance of at least about twenty to forty feet or more; by positioning the generator 10 sufficiently ahead of the inlet 5A, the incidence of inlet distortion of the air entering the inlet 5A is reduced. Further, the separation of the generator 10 and engine 5 helps preserve the fore and aft weight balance of the aircraft 100. Shaft 15 may also include a gear reduction to change the speed of the rotation of the gas turbine engine to the lower speed needed by generator 10 for electric power generation.

Because of the ability to selectively engage the hybrid propulsion system 1 with the rotors 30 and accompanying blades 32, 34, three modes of aircraft 100 operation are possible, including a helicopter mode, gyrocopter mode and fixed-wing mode. In the helicopter mode of operation, both of the clutches 20, 60 (the first between the engine 5 and the generator 10 and the second between the DC motor 25 and its respective rotor 30) will be engaged or activated such that the rotors 30 will supply a major amount of both thrust and lift. In the gyrocopter mode, the rotor clutch 60 may be disconnected to permit the rotors 30 to turn freely in flight to supply lift only. In either mode, the rotors 30 may turns in opposing circular motions. For example, the starboard-side rotor 30 may spin in a clockwise direction while the port side rotor spins in the counterclockwise direction. In one more particular approach, there may be a slight aerodynamic advantage to having both rotors 30 turning outward. Lastly (as will be discussed in conjunction with FIG. 4 below), in a fixed-wing mode, the two outboard rotor clutches 60 may be deactivated while the rotors 30 are fixed in a particular angular orientation relative to the incoming air stream to permit the two diametrically opposed blades 32, 34 of each rotor 30 to function as fixed (i.e., non-rotating) aerodynamic lift surfaces. The availability of all these flight safety and performance features insures a very broad applicability for both civilian and military applications. In one form, the anticipated speed achievable by each of these designs is 250 knots in helicopter mode, 350 knots in autogyro mode, and 450 knots in fixed-wing mode.

By permitting the rotors 30 on opposing sides of the fuselage 105 to counter-rotate, the need for an anti-torque vertical rotor is removed. In one embodiment the aircraft 100 has two wheels 110 in each of the front and back, the wheels closest to the front of the vehicle being steerable. Likewise, the fuselage 105 may be made of a suitable dimension in accordance with its mission; in one particular form, the fuselage 105 is generally twelve feet wide, ninety-six feet long, and twelve feet high with the body and many parts being constructed of aluminum, aluminum-based alloys or polymer reinforced composites. Particular devices, such as front or rear doors, may also be built into the aircraft 100 to facilitate ease of loading or unloading of personnel, payloads or the like. In one embodiment, a floorboard will be four feet above the lowermost part of interior surface of the body of aircraft 100. The space below the floorboard may be divided into numerous (for example, eight) modules with preferable dimensions of about 12'×12'×4'. In such a configuration, the most central of these modules could be devoted to the fuel tank, while the remaining modules could be used to store lithium-ion batteries that make up battery packs 35, 65. Further, a telescoping ramp may be utilized for loading payload or personnel onto the aircraft 100.

While aircraft 100 is in its gyrocopter mode, the infinite variability of the speed of the rotors 30 and the use of the gas turbine engines 5 for directional steering render a tail rotor unnecessary. Horizontal and vertical stability fins 125 similar to those found on fixed-wing aircraft may also be used. Furthermore, aircraft 100 may be in the form of a multi-rotored gyrocopter. Gyrocopter operation highlights a particularly advantageous configuration that uses the in-line configuration of the propulsion system 1 that is depicted in FIG. 1 in order to achieve the aforementioned fore/aft weight balance, as well as to avoid electric generator 10 induced turbulence at the inlet 5A of gas turbine engine 5. In this mode, the aircraft 100 can fly farther and faster and use less fuel than this or other helicopters. Finally, the conversion from a helicopter mode to a gyrocopter mode can be made on the ground as well as during flight by activating or deactivating the electrical connect-disconnect clutches 60 that bridge rotor 30 with rotary movement through an intermediate rotatable shaft 122 that spins about a generally vertical axis.

Likewise, while aircraft 100 is in its helicopter mode, it has the ability to take off vertically and hover. Likewise, aircraft 100 is capable of autogyro mode during flight, where in autogyro mode with the side-by-side rotors 30, directional steering can be accomplished by varying the speed of the gas turbine engine 5 which is still producing forward thrust via gas exhaust 5B. Moreover, the outboard rotors 30 are able to be independently controlled; this in turn greatly improves and facilitates in-flight control and turning. The outboard rotors 30 may be spaced such that the rotor blades mounted thereto do not overlap the fuselage or body of the aircraft, eliminating the noise that is caused by the acoustic interaction of the blades and the body as the blades pass over. In one form, each of blades 32, 34 are mounted through their rotors 30 along respective port and starboard sides of the aircraft 100 such that the tips T of blades 32, 34 do not project over the fuselage 105. In this way, acoustic interactions between the passing blades 32, 34 and the fuselage 105 are reduced or eliminated. In one preferred form, there is at least a six inch lateral gap between the outermost projection of the fuselage 105 and the innermost projection of the blades 32, 34. In one exemplary form, the tip-to-tip length of each of the rotors 30 is about twenty four feet. Thus, for the two outboard rotors 30 shown plus the width of the fuselage 105, an effective wingspan of about sixty one feet may be produced. The present construction allows the two blades 32, 34 to take on attributes of a longer, wing-like airfoil. This reduction in the number of blades to two helps reduce undesirable aerodynamic forces that could otherwise hamper the lift being generated when the aircraft 100 operates in the fixed-wing mode of operation that will be discussed in more detail below.

Depending on the size of the aircraft, an additional set (not shown) of gas turbine engines 5 may be utilized, bring the total to four. Such additional power may be required for so-called "heavy lifter" helicopter configurations (not shown). The additional rotors are placed in the rear quadrant of the aircraft 100 and should have the same general vertical placement so that the rotors are level to the top of the fuselage 105 of the aircraft 100 and placed outward at a distance such that these additional rotors—in a manner similar to that of the previously-discussed rotors 30—will avoid passing over the fuselage 105 by a distance of about six inches. Significantly, such additional rotor movement could be achieved without additional gas turbine engines 5 or generators 10. In one form, engine 5 size and thrust can be increased to handle the extra load requirements. As with rotors 30, these additional rotors may be equipped with connect/disconnect clutches to comport with helicopter, gyrocopter or fixed-wing modes of operation.

Tail 125 of aircraft 100 may a conventional rudder 135 and elevators 127 for improved steering and flight control. While in its helicopter mode, the electricity provided by the onboard battery pack 35 provides enough power to the electric motor (or motors) 25 to fly at least a portion of the flight envelope with significantly-reduced thermal signature by temporarily either scaling back engine exhaust gas output or eliminating it altogether through engine shutdown. This is an important feature for military uses where heat-seeking missiles are a threat. Crossover (i.e., redundant) electric wiring may be used so that if the electric power from one engine 5 or generator 10 is lost, power from the remaining engine(s) 5 or generator(s) 10 can power the other engine, albeit at a slower rate to allow the aircraft 100 to proceed to a safe emergency landing or the like. All electric flight controls make it possible to use on board computers (such as those associated with controller 40); in such circumstances, the aircraft 100 may be configured for robotic flight as a UAV if desired.

Figure 4:
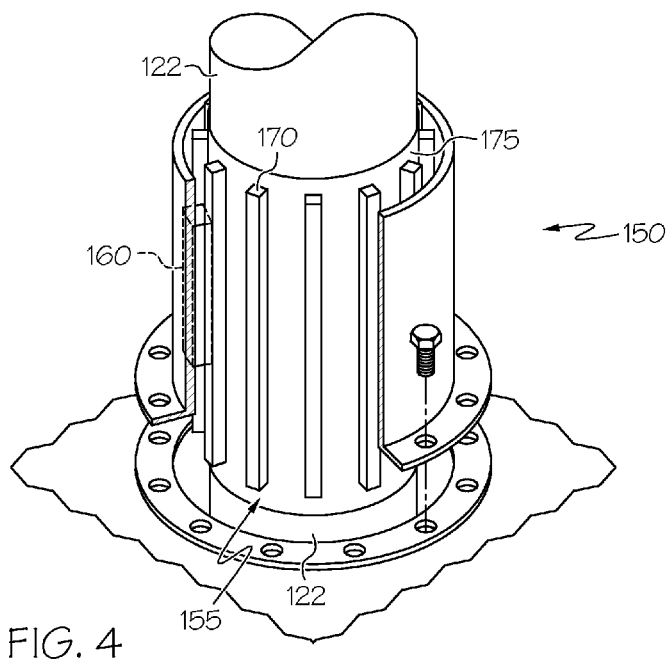
FIG. 4 shows a detent lock mechanism used to selectively establish fixed-wing operation of the aircraft of FIGS. 2 and 3.

Referring with particularity to FIG. 4, another significant mode of operation of aircraft 100 is as a fixed-wing vehicle where the bladed rotors 30 are disconnected from the engine 5 by clutch 60 and the bladed rotors 30 are locked in place at varying degrees by means of a solenoid activated detent locking mechanism 150. The term "detent locking mechanism" is used in the present context to signify a catch which when engaged prevents rotational movement of a device (such as rotor 30 and the rotatable shaft 122 to which it is attached). In one embodiment of the solenoid activated detent locking mechanism 150, a sleeve ring 155 contains notches at select angular locations. In one exemplary form (shown on the right-hand side of aircraft 100 in FIG. 2), such angular locations can be at 90, 100, 110 and 120 degree positions relative to the flight path formed along the longitudinal axis of the fuselage 105. Such positions—which correspond to varying degrees of wing sweepback—may correspond with a particular speed regime or flight envelope of the aircraft 100. In addition to a solenoid, operation of the detent mechanism 150 may be through other conventional means so long as it causes (much like the operation of the solenoid) detents 160 to engage with companion projections 170 formed around the periphery of a rotatable coupling 175 that is rotationally affixed to shaft 122. Projections 170 are formed at the desired angles that correspond to fixing the two blades of rotor 30 about a (now-fixed) axis of rotation such that the now-locked bladed rotors 130 define generally horizontal wings to provide lift only (thereby causing aircraft 100 to now get all of its propulsive thrust from the gas turbine engine 5). In an alternate embodiment, instead of projections 170 formed around the periphery of a rotatable coupling 175, slots (not shown) could be used to allow each of the detents 160 (when activated) to proceed along a radially-inward path until such time as they engage a respective one of the slots. Regardless of the actuation mechanism, detent 160, when activated (such as by a spring, magnetic action or other solenoid-responsive structure) engages sleeve ring 155, which in turn prevents bladed rotors 30 from rotational movement by forming a rotationally locked engagement. The present angled selections made possible by the detent locking mechanism 150 are exemplary only, and it will be appreciated by those having ordinary skill in the art that the ability to lock the bladed rotors 30 in other angular degrees is likewise within the scope of the present invention. Likewise, details pertaining to the precise nature of detent mechanism are not shown, such as rotational or spring-biasing features, as well as cooperation with aforementioned controller 40. In this fixed-wing configuration, the aircraft 100 functions as a jet plane, where engines 5 would provide thrust while bladed rotors 30 in their fixed positions would provide wing-like lift.

As mentioned above, the present inventor recognizes that the aerodynamic lift surfaces formed by the blades 32, 34 on the rotors 30 may be configured with an appropriate NACA profile. Thus, when aircraft 100 is configured to have these blades 32, 34 associated with each rotor 30 fixed in place so that aircraft 100 can function as a fixed-wing vehicle, the wing-like structure formed thereby does not function as an aerodynamically-optimized airfoil, in that the lifting attributes of the first blade (for example, blade 32 as shown) that has the incoming air first encounter its leading edge LE will be generally superior to those of the second blade (for example, blade 34 as shown) that has the incoming air first encounter its trailing edge TE. Nevertheless, sufficient lift may be generated by each of these blade pairs to make the aircraft 100 viable for its intended fixed-wing mode of operation.

An important advantage of the dual hybrid propulsion system 1 is that switching between flight modes can be accomplished on the ground or in-flight; in the in-flight variant, such mode-shifting or related conversion must take place at an airspeed sufficient to avoid stall, as well as at an altitude that will permit the aircraft 100 to recover during its temporary loss of lift. In one form, the airspeed is preferably at least 15- to 200 knots (or of an airspeed of at least 50-100 mph above the critical stall speed of the aircraft 100), while the altitude is preferably at least about 2500 feet, although such heights and airspeeds may be different, depending on the aircraft's 100 stall speed and other flight conditions.

Although not shown, variations on the disclosed hybrid propulsion system 1 can also be applied to other modes of transportation such as by land (such as cars, buses, trucks, trains or related wheeled vehicles) or by water (such as boats or the like). In such circumstances, improved land-based winter travel is possible, as the propulsion source may be decoupled from the wheels that otherwise may be prone to spinning on an icy or otherwise slick surface. Likewise, reduced stopping may be employed, as a gas turbine engine may take advantage of thrust reversal in a manner generally similar to that used on aircraft. By way of example, a railroad locomotive could take advantage of the engines of the present invention to use (possibly in conjunction with conventional propulsion motors) to supply greater starting torque and hauling capacity for long-haul freight. Such a locomotive could be used as an alternative to magneto-levitation in engines for very high speed rail transport. Furthermore, with watercraft, one or more gas turbine engines could be selectively coupled via shaft to the generator that is in turn cooperative with an electric motor that could be connected to the ship propellers via an electronic connect-disconnect clutch. With the electronic clutches activated the jet engines supplies the power to the generator and thus to the propeller for conventional motive power. Again as with the other applications conversion from one motive power to the other can be obtained while underway or during start up.

While certain representative embodiments and details have been shown for purposes of illustrating the invention, it will be apparent to those skilled in the art that various changes may be made without departing from the scope of the invention, which is defined in the appended claims.

What is claimed is:
1. An aircraft comprising:
a fuselage;

a plurality of rotors each of which is coupled to said fuselage through a rotatable shaft, said plurality of rotors comprising side-by-side rotors comprising:
   a first rotor situated on a port side of said fuselage such that said first rotor spins in one of a clockwise or counterclockwise direction; and
   a second rotor situated on a starboard side of said fuselage such that said second rotor spins in an opposing of said clockwise or counterclockwise direction, each of said plurality of rotors comprising two generally opposed rotor blades each of which defines at least one aerodynamic lift surface thereon;
wherein said aircraft does not have a tail rotor;
a propulsion system selectively cooperative with each of said rotatable shafts to deliver at least one of torque thereto and thrust to said aircraft such that said aircraft may operate in a plurality of flight modes; and
a plurality of devices configured to provide said selective cooperation between each of said rotatable shafts and said propulsion system such that while in a first of said plurality of flight modes, torque generated by said propulsion system is decoupled from movement of each of said rotatable shafts while permitting said plurality of rotors to spin, while in a second of said plurality of flight modes, torque generated by said propulsion system is coupled to said plurality of rotors through movement of each of said rotatable shafts to control said spin of said plurality of rotors, while in a third of said plurality of flight modes, each of said rotatable shafts is decoupled from said torque generated by said propulsion system while said plurality of rotors are further prevented from rotating such that said at least one aerodynamic lift surface is affixed at an orientation relative to a flight path of said aircraft such that said aircraft functions as a fixed-wing vehicle and when said aircraft is operating as said fixed-wing vehicle, said side-by-side rotors are each locked in place at varying degrees by a respective detent locking mechanism, said detent locking mechanisms each engaging a sleeve ring containing notches at select angular locations corresponding to varying degrees of wing sweepback, said notches coupling with companion projections around the periphery of a rotatable coupling rotationally affixed to one of said rotatable shafts.

2. The aircraft of claim 1, wherein said propulsion system comprises a plurality of propulsion-generating devices comprising:
   at least two internal combustion engines mounted on generally opposing sides of said fuselage, said at least two internal combustion engines configured to deliver at least one of said torque and said thrust;
   at least one battery configured to deliver said torque;
   a plurality of electric current generators each selectively cooperative with said at least one battery and a respective one of said at least two internal combustion engines; and
   an electric motor configured to receive electric current from at least one of said plurality of electric current generators and said at least one battery such that said received electric current selectively delivers said torque to said rotatable shaft.

3. The aircraft of claim 2, wherein said aircraft receives a substantial entirety of its forward thrust directly from said propulsion system in said first of said plurality of flight modes and said third of said plurality of flight modes.

4. The aircraft of claim 2, wherein a substantial entirety of torque used to rotate said plurality of rotors is received from said at least one of said at least one battery and said internal combustion engine during said second of said plurality of flight modes.

5. The aircraft of claim 2, wherein each of said plurality of devices is configured to provide said selective engagement between said rotatable shaft and said propulsion system comprises a clutch.

6. The aircraft of claim 5, wherein said plurality of clutches comprise:
   a motor clutch disposed between said internal combustion engine and a respective one of said plurality of electric current generators such that when said motor clutch is engaged, said torque produced by said internal combustion engine cooperates with said electric current generator to deliver electric current to at least one of said at least one battery and said rotatable shaft, while in situations where said motor clutch is not engaged, said torque produced by said internal combustion engine is decoupled from said electric current generator such that to the extent that any of said torque is being delivered to said rotatable shaft, it is coming from said at least one battery, and
   a rotor clutch disposed between said electric motor and said rotatable shaft.

7. The aircraft of claim 6, wherein said detent mechanism is selectively cooperative with said rotor clutch such that upon said locking of said side-by-side rotors, a respective one of said plurality of rotors establishes a fixed angular orientation of said at least one aerodynamic lift surface relative to the longitudinal axis of said fuselage.

8. The aircraft of claim 7, wherein said fixed angular orientation comprises one of about 90 degrees, 100 degrees, 110 degrees or 120 degrees relative to a flight path formed along said longitudinal axis of said fuselage.

9. The aircraft of claim 2, further comprising a controller cooperative with said at least two internal combustion engines to provide separate control signals thereto such that at least one of flight steering and turning is controllable thereby.

10. The aircraft of claim 1 further comprising a transceiver, said aircraft comprising an unmanned air vehicle configured for remote flying.

11. The aircraft of claim 10 further comprising a controller configured to actuate full robotic control of said aircraft for take-offs and landings.

12. The aircraft of claim 11 further comprising a throttle control for each of said plurality of rotors so that power to each of said plurality of rotors can be separately controlled.

13. An aircraft comprising:
a fuselage;
a plurality of rotors each of which is coupled to said fuselage through a rotatable shaft, said plurality of rotors comprising side-by-side rotors comprising:
   a first rotor situated on a port side of said fuselage such that said first rotor spins in one of a clockwise or counterclockwise direction; and
   a second rotor situated on a starboard side of said fuselage such that said second rotor spins in an opposing of said clockwise or counterclockwise direction, each of said plurality of rotors comprising two rotor blades each of which defines at least one aerodynamic lift surface thereon;
wherein said aircraft does not have a tail rotor;
a hybrid propulsion system configured to deliver at least one of torque to each of said rotatable shafts and thrust to said fuselage; and
a plurality of clutches configured to provide selective engagement between each of said rotatable shafts and said hybrid propulsion system such that said aircraft may operate in a plurality of flight modes comprising at least a helicopter mode, a gyrocopter mode and a fixed-wing aircraft mode and when said aircraft is operating as a fixed-wing vehicle, said side-by-side rotors are each locked in place at varying degrees by a respective detent locking mechanism, said detent locking mechanisms each engaging a sleeve ring containing notches at select angular locations corresponding to varying degrees of wing sweepback, said notches coupling with companion projections around the periphery of a rotatable coupling rotationally affixed to one of said rotatable shafts.

14. The aircraft of claim 13, wherein upon said locking of the side-by-side rotors a respective one of said plurality of rotors establishes a fixed angular orientation of said at least one aerodynamic lift surface relative to the longitudinal axis of said fuselage to define said fixed-wing aircraft flight mode.

15. The aircraft of claim 14, wherein said hybrid propulsion system comprises:
a plurality of internal combustion engines coupled to said fuselage;
at least one battery;
a plurality of electric current generators each selectively cooperative with said at least one battery and a respective one of said plurality of internal combustion engines such that in situations where said torque is being delivered at least in part from at least one of said plurality of internal combustion engines to a respective one of said plurality of electric current generators, said electric current generator produces electric current, while in situations where said torque is being delivered substantially entirely from said at least one battery, said electric current generator produces substantially no electric current; and
an electric motor configured to receive electric current from said plurality of electric current generators and said at least one battery such that said received electric current selectively delivers said torque.

16. The aircraft of claim 15, wherein a substantial entirety of propulsion provided to said aircraft comes from said thrust produced by at least one of said plurality of internal combustion engines during said fixed-wing aircraft mode.

17. The aircraft of claim 15, wherein a substantial entirety of propulsion provided to said aircraft comes from said torque produced by said plurality of internal combustion engines and said at least one battery during said helicopter mode.

18. The aircraft of claim 15, wherein said detent locking mechanism and said plurality of clutches cooperate to decouple said torque from movement of said plurality of rotors while permitting said plurality of rotors to freely spin such that said at least one rotor causes said aircraft to function as a gyrocopter.

19. The aircraft of claim 15, wherein said rotor locking mechanism is solenoid-actuated.

20. A method of providing motive power to an aircraft, said method comprising:
configuring said aircraft to comprise a fuselage, a plurality of rotors each of which is selectively coupled to said fuselage through a respective rotatable shaft, said plurality of rotors comprising side-by-side rotors comprising: a first rotor situated on a port side of said fuselage such that said first rotor spins in one of a clockwise or counterclockwise direction; and a second rotor situated on a starboard side of said fuselage such that said second rotor spins in an opposing said clockwise or counterclockwise direction, and a rotor clutch where each of said plurality of rotors comprises a plurality of rotor blades at least one of which defines at least one aerodynamic lift surface thereon, wherein said aircraft does not have a tail rotor; and a hybrid propulsion system to selectively deliver at least one of thrust and torque to at least one of said fuselage and said plurality of rotors, said hybrid propulsion system comprising:
a plurality of internal combustion engines each with a respective motor clutch;
at least one battery;
a plurality of electric current generators each selectively cooperative with said at least one battery and a respective one of said plurality of internal combustion engines such that in situations where said torque is being delivered at least in part from said plurality of internal combustion engines to each of said plurality of electric current generators, said plurality of electric current generators produce electric current, while in situations where said torque is being delivered substantially entirely from said at least one battery to said plurality of rotors, said plurality of electric current generators produce substantially no electric current; and
an electric motor configured to receive electric current from said plurality of electric current generators and said at least one battery such that said received electric current selectively delivers said torque to said rotatable shafts;
operating at least one of said rotor clutch and said motor clutch to provide selective engagement between said rotatable shaft and said hybrid propulsion system; and
operating said hybrid propulsion system such that power produced therefrom in conjunction with said operation of said at least one of said rotor clutch and said motor clutch causes said aircraft to operate in a plurality of flight modes comprising at least a helicopter mode, gyrocopter mode and a fixed-wing aircraft mode; and
operating the aircraft in the fixed-wing flight mode and locking each of said side-by-side rotors in place at varying degrees via a detent locking mechanism, said detent locking mechanisms each engaging a sleeve ring containing notches at select angular locations corresponding to varying degrees of wing sweepback, said notches coupling with companion projections around the periphery of a rotatable coupling rotationally affixed to one of said rotatable shafts.

21. The method of claim 20, further comprising establishing, via said plurality of rotors, a fixed angular orientation of said at least one aerodynamic lift surface relative to the longitudinal axis of said fuselage to define said fixed-wing aircraft flight mode via said locking of said side-by-side rotors.

22. The method of claim 21, further comprising operating said detent locking mechanism and at least one of said rotor clutch and said motor clutch to decouple said torque from movement of said plurality of rotors while permitting said plurality of rotors to freely spin such that said plurality of rotors causes said aircraft to function as said gyrocopter.

23. The method of claim 20, further comprising reducing rotor noise emanating from said aircraft by configuring said plurality of rotors to extend laterally from said fuselage a sufficient distance such that a footprint defined by said plurality of rotor blades does not extend over said fuselage.

24. The method of claim 20, wherein said plurality of rotor blades comprises two blades diametrically opposed from one another on a hub coupled to a respective one of said plurality of rotors.

* * * * *